US012671987B2

(12) United States Patent
Elshafie et al.

(10) Patent No.: US 12,671,987 B2
(45) Date of Patent: Jun. 30, 2026

(54) SIDELINK CHANNEL SECURITY

(71) Applicant: QUALCOMM Incorporated, San Diego, CA (US)

(72) Inventors: Ahmed Elshafie, San Diego, CA (US); Hung Dinh Ly, San Diego, CA (US); Seyedkianoush Hosseini, San Diego, CA (US); Alexandros Manolakos, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 282 days.

(21) Appl. No.: 18/565,373

(22) PCT Filed: May 27, 2022

(86) PCT No.: PCT/US2022/072621
§ 371 (c)(1),
(2) Date: Nov. 29, 2023

(87) PCT Pub. No.: WO2023/019039
PCT Pub. Date: Feb. 16, 2023

(65) Prior Publication Data
US 2024/0259794 A1 Aug. 1, 2024

(30) Foreign Application Priority Data

Aug. 9, 2021 (GR) .............................. 20210100544

(51) Int. Cl.
*H04W 12/04* (2021.01)
*H04W 12/037* (2021.01)
*H04W 92/18* (2009.01)

(52) U.S. Cl.
CPC ......... *H04W 12/037* (2021.01); *H04W 12/04* (2013.01); *H04W 92/18* (2013.01)

(58) Field of Classification Search
CPC ..................................................... H04W 12/037
(Continued)

(56) References Cited

U.S. PATENT DOCUMENTS

| | | | |
|---|---|---|---|
| 6,792,112 B1 * | 9/2004 | Campbell | H04W 12/033 380/270 |
| 11,495,144 B2 * | 11/2022 | Rau | G06F 7/729 |
| 2015/0208235 A1 * | 7/2015 | Ingale | H04L 5/0048 455/411 |
| 2018/0123682 A1 * | 5/2018 | Jung | H04W 40/22 |
| 2020/0260512 A1 * | 8/2020 | Cheng | H04W 76/14 |

(Continued)

FOREIGN PATENT DOCUMENTS

| | | |
|---|---|---|
| CN | 112514300 A | 3/2021 |
| WO | WO-2021033988 A1 | 2/2021 |

OTHER PUBLICATIONS

3GPP TS 38.211: "3rd Generation Partnership Project, Technical Specification Group Radio Access Network, NR, Physical Channels and Modulation (Release 16)", 3GPP Standard, Technical Specification, 3rd Generation Partnership Project, Mobile Competence Centre, 650, Route Des Lucioles, F-06921 Sophia-Antipolis Cedex, France, vol. RAN WG1, No. V16.6.0, Jun. 30, 2021, pp. 1-129, XP052029950, paragraphs [0008]-[8.1.1], paragraphs [08.3]-[8.3.2.1].

(Continued)

*Primary Examiner* — Qutbuddin Ghulamali
(74) *Attorney, Agent, or Firm* — Harrity & Harrity, LLP

(57) ABSTRACT
Various aspects of the present disclosure generally relate to wireless communication. In some aspects, a first user equipment (UE) may secure a communication for a physical sidelink channel using a secret key, such as a group common secret key or a UE-specific secret key. The UE may transmit the secured communication on the physical sidelink channel to a second UE. The second UE may extract the communication from the secured communication based at least in part on the secret key. Numerous other aspects are described.

30 Claims, 9 Drawing Sheets

(58) Field of Classification Search
USPC .......................................................... 455/410
See application file for complete search history.

(56) References Cited

U.S. PATENT DOCUMENTS

2020/0288535 A1* 9/2020 Sharma .............. H04W 36/0033
2021/0037517 A1   2/2021 Lei et al.

OTHER PUBLICATIONS

Huawei, et al., "Remaining Details of Sidelink Physical Layer Structure", 3GPP TSG RAN WG1 Meeting #100bis-e, R1-2001550, 3rd Generation Partnership Project, Mobile Competence Centre, 650, Route Des Lucioles, F-06921 Sophia-Antipolis Cedex, France, vol. RAN WG1, No. Online Meeting, E-meeting, Apr. 20, 2020-Apr. 30, 2020, 27 Pages, Apr. 11, 2020, XP051875141, paragraphs [0002]-[02.6].
International Search Report and Written Opinion—PCT/US2022/072621—ISA/EPO—Aug. 23, 2022.
Vivo: "Remaining Issues on Physical Layer Structure for NR Sidelink", 3GPP TSG-RAN WG1 Meeting #101, R1-2003377, 3rd Generation Partnership Project, Mobile Competence Centre, 650, Route Des Lucioles, F-06921 Sophia-Antipolis Cedex, France, vol. RAN WG1, No. e-Meeting, May 25, 2020-Jun. 5, 2020, 17 Pages, May 16, 2020, XP051885166.

* cited by examiner

405
Secure sidelink communication using a secret key (group common or UE-specific)

UE 302

410
Transmit secured communication

UE 306

415
Extract sidelink communication from secured communication based on secret key

UE 304

400

600

610 Secure a communication for a physical sidelink channel using a secret key

620 Transmit the secured communication on the physical sidelink channel

710   Receive a secured communication for a sidelink channel that is secured with a secret key 720   Extract a communication from the secured communication based at least in part on the secret key

700

SIDELINK CHANNEL SECURITY

CROSS-REFERENCE TO RELATED APPLICATIONS

This Patent Application is a 371 national stage of PCT Application No. PCT/US2022/072621 filed on May 27, 2022, entitled "SIDELINK CHANNEL SECURITY," which claims priority to Greek Patent Application No. 20210100544, filed on Aug. 9, 2021, entitled "SIDELINK CHANNEL SECURITY," which are hereby expressly incorporated by reference herein.

FIELD OF THE DISCLOSURE

Aspects of the present disclosure generally relate to wireless communication and to techniques and apparatuses for securing a communication on a sidelink channel.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include securing a communication for a physical sidelink channel using a secret key. The method may include transmitting the secured communication on the physical sidelink channel to a second UE.

Some aspects described herein relate to a method of wireless communication performed by a second UE. The method may include receiving, from a first UE, a secured communication for a sidelink channel that is secured with a secret key. The method may include extracting a communication from the secured communication based at least in part on the secret key.

Some aspects described herein relate to a first UE for wireless communication. The first UE may include a memory and one or more processors coupled to the memory. The one or more processors may be configured to secure a communication for a physical sidelink channel using a secret key. The one or more processors may be configured to transmit the secured communication on the physical sidelink channel to a second UE.

Some aspects described herein relate to a second UE for wireless communication. The second UE may include a memory and one or more processors coupled to the memory. The one or more processors may be configured to receive, from a first UE, a secured communication for a sidelink channel that is secured with a secret key. The one or more processors may be configured to extract a communication from the secured communication based at least in part on the secret key.

Some aspects described herein relate to a non-transitory computer-readable medium that stores a set of instructions for wireless communication by a first UE. The set of instructions, when executed by one or more processors of the first UE, may cause the first UE to secure a communication for a physical sidelink channel using a secret key. The set of instructions, when executed by one or more processors of the first UE, may cause the first UE to transmit the secured communication on the physical sidelink channel to a second UE.

Some aspects described herein relate to a non-transitory computer-readable medium that stores a set of instructions for wireless communication by a second UE. The set of instructions, when executed by one or more processors of the second UE, may cause the second UE to receive, from a first UE, a secured communication for a sidelink channel that is secured with a secret key. The set of instructions, when executed by one or more processors of the second UE, may cause the second UE to extract a communication from the secured communication based at least in part on the secret key.

Some aspects described herein relate to an apparatus for wireless communication. The apparatus may include means for securing a communication for a physical sidelink channel using a secret key. The apparatus may include means for transmitting the secured communication on the physical sidelink channel to another apparatus.

Some aspects described herein relate to an apparatus for wireless communication. The apparatus may include means for receiving, from another apparatus, a secured communication for a sidelink channel that is secured with a secret key. The apparatus may include means for extracting a communication from the secured communication based at least in part on the secret key.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
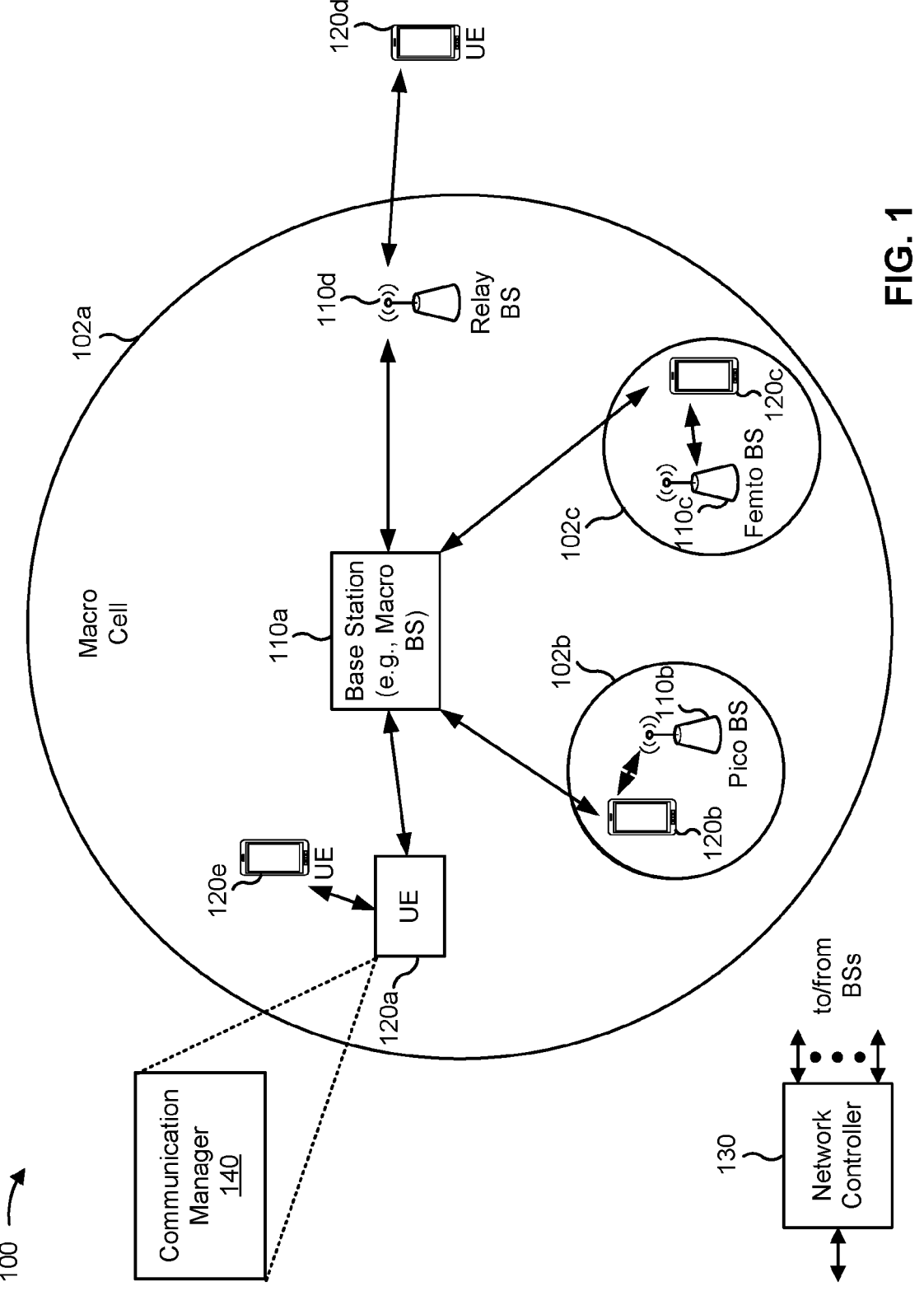
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include midband frequencies, may be within FR2, FR4, FR4-a or FR4-1, and/or FR5, or may be within the EHF band. It is contemplated that the frequencies included in these operating bands (e.g., FR1. FR2, FR3, FR4, FR4-a, FR4-1, and/or FR5) may be modified, and techniques described herein are applicable to those modified frequency ranges.

In some aspects, the UE 120, such as UE 120a, may include a communication manager 140. As described in more detail elsewhere herein, the communication manager 140 may secure a communication for a physical sidelink channel using a secret key and transmit the secured communication on the physical sidelink channel to another UE, such as UE 120e. Additionally, or alternatively, the communication manager 140 may perform one or more other operations described herein.

In some aspects, the UE 120, such as UE 120e, may include a communication manager 140. As described in more detail elsewhere herein, the communication manager 140 may receive, from another UE such as UE 120a, a secured communication for a sidelink channel that is secured with a secret key and extract a communication from the secured communication based at least in part on the secret key. Additionally, or alternatively, the communication manager 140 may perform one or more other operations described herein.

As indicated above, FIG. 1 is provided as an example. Other examples may differ from what is described with regard to FIG. 1.

Figure 2:
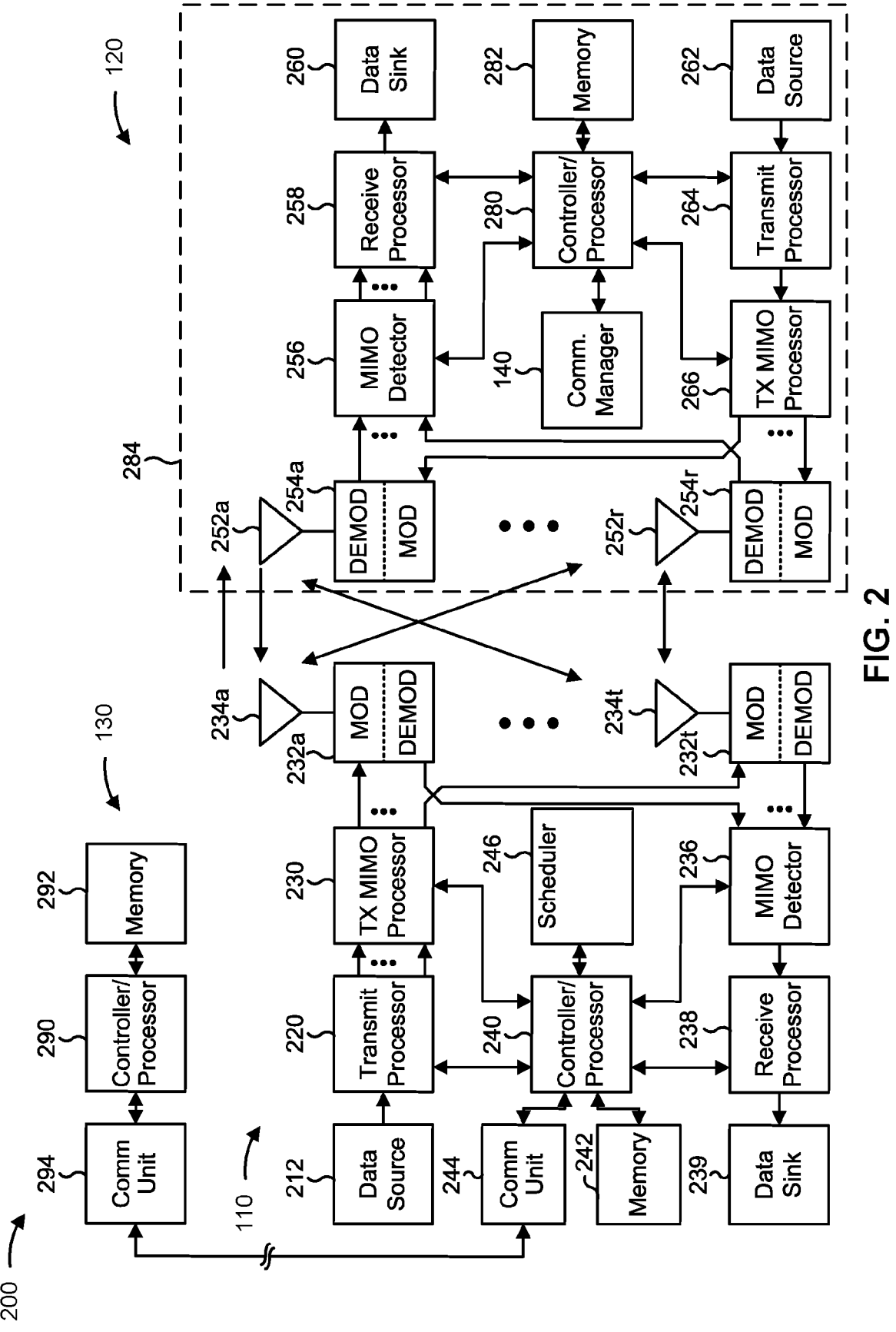
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 1-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor

230. The transceiver may be used by a processor (e.g., the controller/processor 240) and the memory 242 to perform aspects of any of the methods described herein (e.g., with reference to FIGS. 1-9).

The controller/processor 240 of the base station 110, the controller/processor 280 of the UE 120, and/or any other component(s) of FIG. 2 may perform one or more techniques associated with securing a communication on a physical sidelink channel, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, a first UE (e.g., UE 120) includes means for securing a communication for a physical sidelink channel using a secret key and/or means for transmitting the secured communication on the physical sidelink channel to a second UE. The means for the first UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a second UE (e.g., UE 120) includes means for receiving, from a first UE, a secured communication for a sidelink channel that is secured with a secret key and/or means for extracting a communication from the secured communication based at least in part on the secret key. The means for the second UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
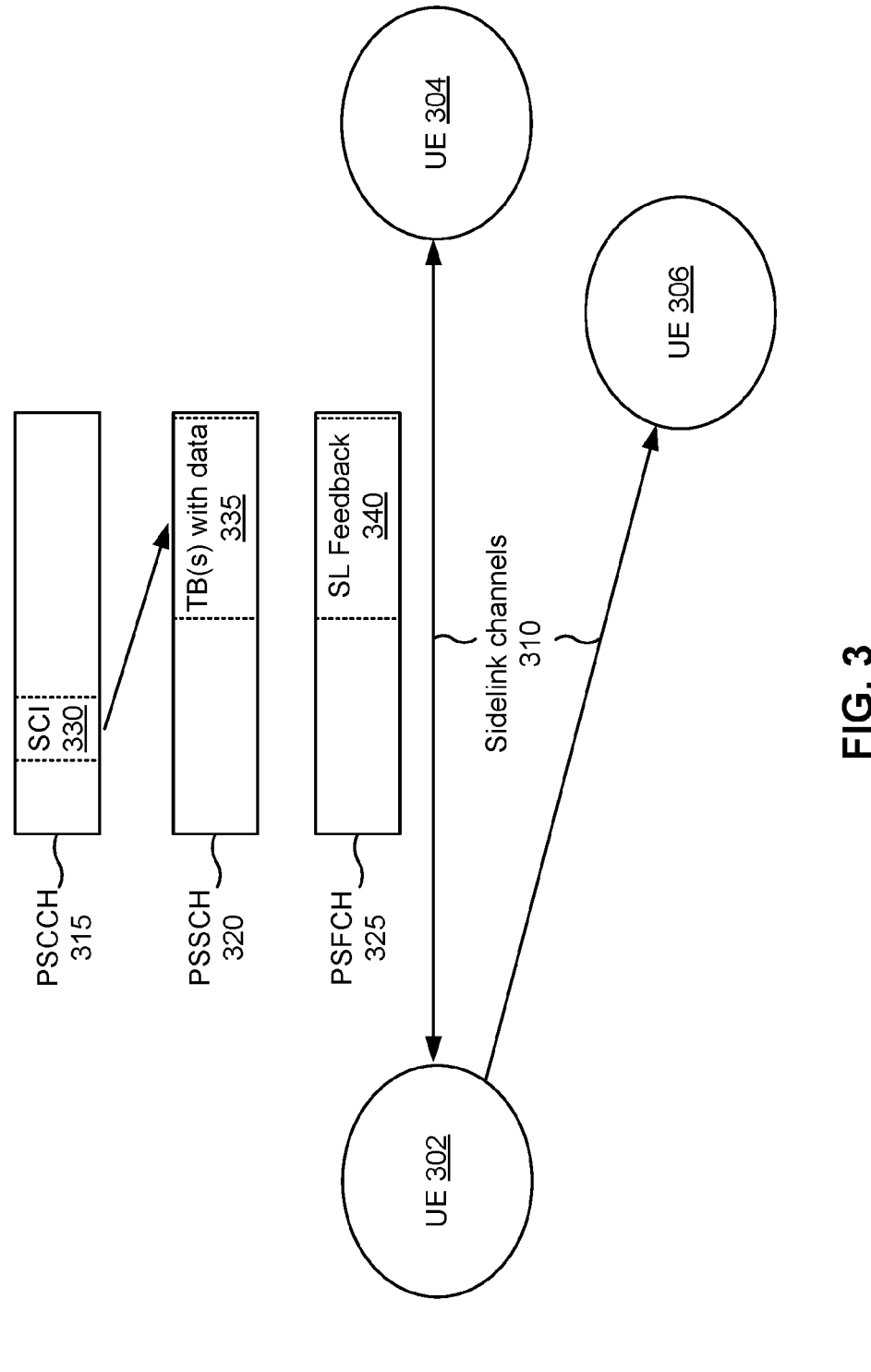
FIG. 3 is a diagram illustrating an example of sidelink communications, in accordance with the present disclosure.

FIG. 3 is a diagram illustrating an example 300 of sidelink communications, in accordance with the present disclosure. As shown in FIG. 3, a first UE 302 may communicate with a second UE 304 (and one or more other UEs) via one or more sidelink channels 310. UE 302 and UE 304 may communicate using the one or more sidelink channels 310 for P2P communications, D2D communications, V2X communications (e.g., which may include V2V communications, V2I communications, and/or V2P communications) and/or mesh networking. In some aspects, UE 302 and UE 304 may correspond to one or more other UEs. In some aspects, the one or more sidelink channels 310 may use a PC5 interface and/or may operate in a high frequency band (e.g., the 5.9 gigahertz (GHz) band). Additionally, or alternatively, UE 302 and UE 304 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station (e.g., base station 110) via an access link or an access channel. The PSSCH 320 may be used to communicate data, similar to a physical downlink shared channel (PDSCH) and/or a physical uplink shared channel (PUSCH) used for cellular communications with a base station via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data.

The SCI may include SCI-1 content or SCI-2 content. SCI-1 may include a priority or quality of service (QoS) value, a PSSCH resource (frequency/time), a resource reservation period (if enabled), a PSSCH DMRS pattern, a $2^{nd}$ SCI format (e.g., information on the size of the $2^{nd}$ SCI), a 2-bit beta offset for $2^{nd}$ stage control resource allocation, a quantity of PSSCH DMRS ports (1 or 2), and/or a 5-bit MCS. SCI-2 content may include a hybrid automatic repeat request (HARQ) process identifier (ID), a new data indicator (NDI), a source ID, a destination ID, and/or a channel state information (CSI) report trigger (for unicast). For groupcast option 1 (negative acknowledgement (NACK)-only distance-based feedback), SCI-2 may include a zone ID indicating the location of the transmitter and/or a maximum communication range for sending feedback.

The PSCCH may be 2 or 3 symbols (starting symbol may be second symbol) and span 10, 12, 15, 20, or 25 physical resource blocks (PRBs). DMRSs may be present in every PSCCH symbol (placed every $4^{th}$ resource element). A frequency domain orthogonal cover code (FD-OCC) may be applied to DMRSs to reduce the impact of colliding PSCCH transmissions. The FD-OCC may be randomly selected from a set of pre-defined FD-OCCs. The PSFCH 325 may be used to communicate sidelink feedback 340, such as HARQ feedback (e.g., acknowledgement or negative acknowledgement (ACK/NACK) information), transmit power control (TPC), and/or a scheduling request (SR).

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, UE 304 may operate using a transmission mode where resource selection and/or scheduling is performed by UE 302 (e.g., rather than a base station). In some aspects, UE 302 and/or UE 304 may perform resource selection and/or scheduling by sensing channel availability for transmissions. For example, UE 304 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, may measure an RSRQ parameter (e.g., a PSSCH-RSRQ parameter) associated with various sidelink channels, and/or may determine a signal-to-interference ratio (SIR) associated with another UE on a sidelink channel. UE 304 may select a channel for transmission of a sidelink communication based at least in part on the measurement(s).

Additionally, or alternatively, UE 304 may perform resource selection and/or scheduling using SCI 330 received in the PSCCH 315, which may indicate occupied resources and/or channel parameters. Additionally, or alternatively, UE 304 may perform resource selection and/or scheduling by determining a channel busy ratio (CBR) associated with various sidelink channels, which may be used for rate control (e.g., by indicating a maximum number of resource blocks that UE 304 can use for a particular set of subframes).

In the transmission mode where resource selection and/or scheduling is performed by UE 302, UE 302 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some aspects, UE 302 may generate a sidelink grant that indicates one or more parameters for semi-persistent scheduling (SPS), such as a periodicity of a sidelink transmission. Additionally, or alternatively, UE 302 may generate a sidelink grant for event-driven scheduling, such as for an on-demand sidelink message.

UE 302 and UE 304 may operate in sidelink resource allocation Mode 2, in which UE 302 and UE 304 schedule or reserve their own sidelink resources without the assistance or direction of a base station (Mode 1). In some aspects, UE 302 may indicate available sidelink resources to UE 304, and UE 304 may select a sidelink resource for transmission from these available sidelink resources. UE 304 may also sense one or more of the sidelink channels 310 to determine which sidelink resources are available. UE 304 may select a sidelink resource for transmission from the sidelink resources that UE 302 indicates as available and/or from the sidelink resources that UE 304 senses are available. In some aspects, UE 302 may schedule one or more preferred sidelink resources on behalf of UE 304.

Communications on sidelink channels between UE 302 and UE 304 may be susceptible to eavesdropping by another UE (e.g., UE 306) and hostile attacks by devices outside a UE group. The security of sidelink communications may be a significant issue for IoT devices that are connected together.

As indicated above, FIG. 3 is provided as an example. Other examples may differ from what is described with regard to FIG. 3.

Figure 4:
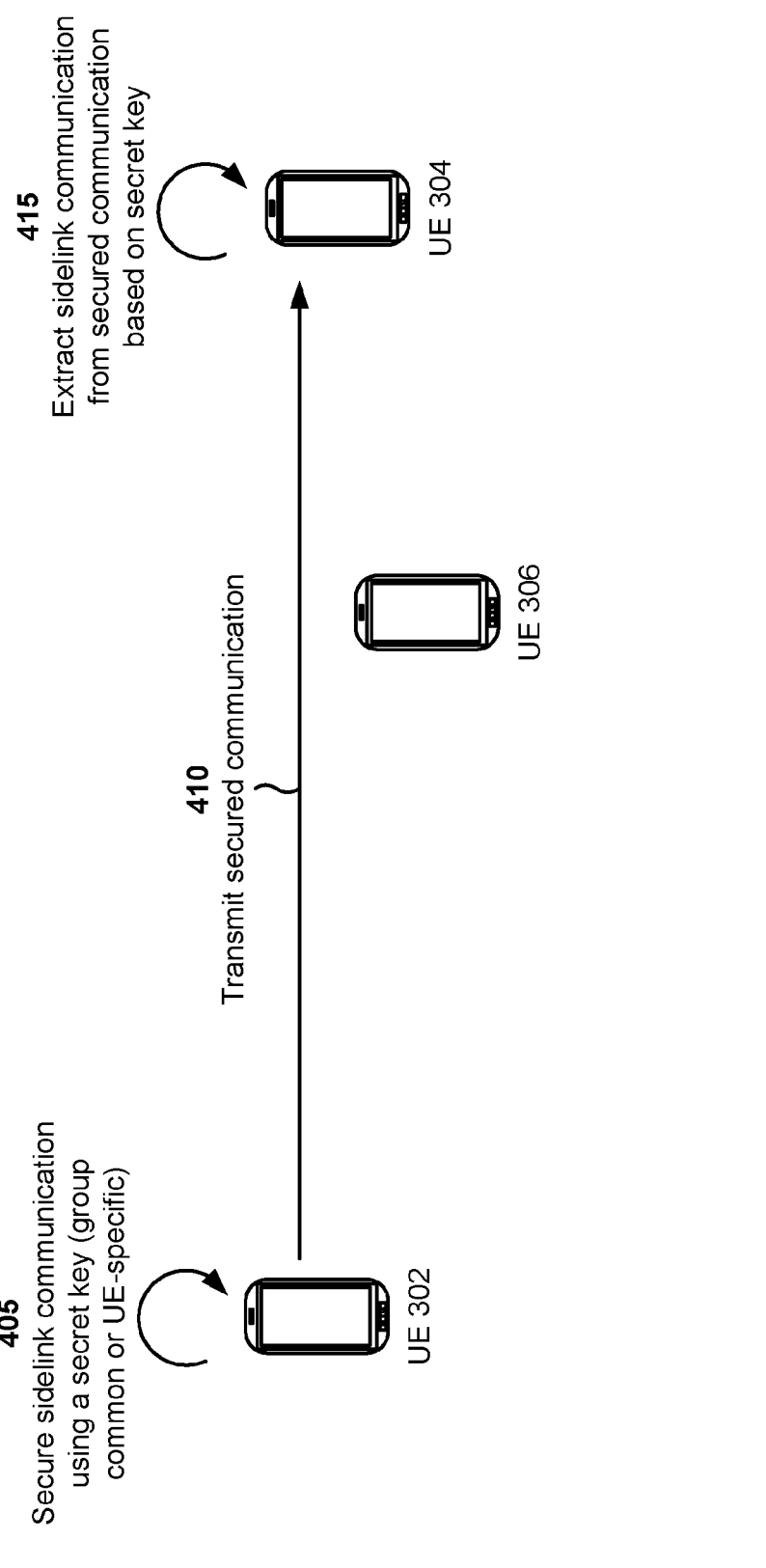
FIG. 4 is a diagram illustrating an example of securing a sidelink communication, in accordance with the present disclosure.

FIG. 4 is a diagram illustrating an example 400 of securing a sidelink communication, in accordance with the present disclosure. As shown in FIG. 4, UE 302 and UE 304 may communicate with one another. UE 306 represents a device that may eavesdrop on a sidelink communication or use information obtained from a sidelink communication to attack UE 302 or UE 304.

According to various aspects described herein, UE 302 may secure a sidelink communication on a physical sidelink channel using a secret key, as shown by reference number 405. For example, the sidelink communication may be data on a PSFCH, SCI-1 on a PSCCH, SCI-2, or a message on the physical sidelink broadcast channel (PSBCH). The secret key may be a group common secret key that is shared among UEs of a UE group or a UE-specific secret key that is known only to UE 302 and/or UE 304. A group common secret key may be used for common channels (for UEs that sense transmissions and decode SCI-1), and the UE-specific secret key may be used for unicast channels (e.g., to randomize the PSCCH bit scrambler). The group common secret key may be used for Mode 2 sidelink resource allocation, and the UE-specific secret key may be used for Mode 1 resource allocation.

For example, a sidelink communication may include PSCCH bits that may be scrambled by a sequence initialized at a fixed value. The sidelink communication may be represented by $\tilde{b}(i)=(b(i)+c(i))$ mod 2, where $b(i)$ represents data and $c(i)$ represents control information. The PSCCH bits may be associated with an initialization value, such as $C_{init}$ (e.g., 1010). UE 302 may secure a communication on the PSCCH by performing an exclusive OR (XOR) operation with $C_{init}$ and the group common secret key, which may be used by UEs that share a resource pool.

As shown by reference number 410, UE 302 may transmit the secured communication, which may be on the PSCCH in example 400. As shown by reference number 415, UE 304 may extract the sidelink communication from the secured communication. For example, UE 304 may also perform an XOR operation with the $C_{init}$ of the secured communication and the group common secret key to obtain the sidelink communication. By securing the sidelink communication, UE 302 and UE 304 may help guard against eavesdropping and hostile attacks that would consume additional processing resources and signaling resources.

UE 302 may obtain the secret key from an upper layer or via the physical layer. The secret key may involve Rivest-Shamir-Adleman (RSA) techniques, elliptic curve cryptography (ECC), type-B secret key extraction (key generation from reference signal), or other techniques. UE 302 may use channel reciprocity and/or randomness at the physical layer. UE 302 may use the secret key to secure bits of communications or sounding signals that are transmitted on a physical sidelink channel.

In some aspects, UE 302 may secure the sidelink communication by adding the secret key partially or fully in decimal form. For example, the sidelink communication may be represented by $\tilde{b}(i)=(b(i)+c(i)+secret\_key\_in\_decimal\_value)$ mod 2. In some aspects, UE 302 may secure the sidelink communication by performing an XOR operation with data bits (b(l)) and the secret key, with control information bits (c(i)) and the secret key, or with both the data and control information (b(i)+c(i)) and the secret key.

In some aspects, FD-OCC may be supported for PSCCH DMRS, and FD-OCC indices may be used to secure sidelink communications. UE 302 may select a sequence $w_{f,i}(k')$ at random for a DMRS quantity of ports (k'). For k'=0, the sequence $w_{f,i}(k')$ may be 1 for FD-OCC index i=0, 1, 2. For k'=1, the sequence $w_{f,i}(k')$ may be 1 for index i=0, $e^{j2/3\pi}$ for i=1, or $e^{-j2/3\pi}$ for i=2. For k'=2, the sequence $w_{f,i}(k)$ may be 1 for index i=0, $e^{-j2/3\pi}$ for i=1, or $e^{j2/3\pi}$ for i=2. In some aspects, UE 302 may select the sequence $w_{f,i}(k)$ using a subset of indices i that are selected from multiple FD-OCC indices based at least in part on the secret key. For example, UE 302 may select a set of three indices from a group of FDD-OCC indices based at least in part on the secret key. This may include performing a modulo operation with multiple FD-OCC indices (e.g., some or all of the available FD-OCC indices) and the secret key. Alternatively, or additionally, this may include performing an XOR operation with multiple FD-OCC indices and the secret key. UE 302 may then perform random selection from the set of three indices. UE 302 may form a secure communication by using an FD-OCC index that is in the subset of FD-OCC indices. In some aspects, UE 304 may use the same or similar process with the secret key to select the FD-OCC index for processing the secure communication.

DMRS scrambling IDs may also be used to secure sidelink communications. There may regularly be one DMRS sequence per resource pool but, in some aspects, there may be multiple DMRS sequences per resource pool. There may also be multiple DMRS scrambling IDs per radio resource control (RRC) configuration, medium access control control element (MAC CE), or resource pool configuration. That is, there may be multiple DMRS scrambling IDs for DMRS sequences. In some aspects, UE 302 may select a subset of DMRS scrambling IDs, from among the multiple DMRS scrambling IDs, based at least in part on the secret key (e.g., via a modulo or XOR operation with the secret key). Alternatively, or additionally, UE 302 may select a DMRS scrambling ID that is in the subset of DMRS scrambling IDs, based at least in part on the secret key (e.g., via a modulo or XOR operation with the secret key). UE 302 may then form a secure communication by using the DMRS scrambling ID. UE 304 may use the same or similar process to determine the DMRS scrambling ID for processing the secure communication.

Encoded bits of SCI-2 may be multiplexed with encoded bits from the downlink shared channel (DL-SCH). Unlike DL-SCH, SCI-2 is not secured by upper layers. In some aspects, UE 302 may secure SCI-2 (carried on the PSSCH) with a group common secret key (if groupcast) or a UE-specific secret key (for unicast). For example, UE 302 may scramble, remap, or XOR the SCI-2 bits with secret key bits to form a secure communication that is transmitted by UE 302. UE 304 may extract the SCI-2 bits by descrambling, remapping, or XORing the bits of the secured communication. In some aspects, UE 302 may scramble the coded SCI-2 bits before multiplexing the scrambled SCI-2 bits with the DL-SCH bits.

In some aspects, UE 302 may secure one or more fields of the SCI-2, rather than all of the fields of the SCI-2, with a secret key. For example, UE 302 may secure the source ID and/or the destination ID, as shown by example 300. The quantity of bits of the SCI-2 that are secured with the secret key may be equal to a quantity of bits of the secret key. Therefore, if there are other bits that may be secured, UE 302 may further secure bits that indicate a redundancy version (RV) for transmission (attacker cannot know start bit for decoding), an NDI (attacker cannot know whether data is old or new), and/or a HARQ process ID. UE 302 may prioritize which bits (or if all bits) are secured based at least in part on a length of the secret key. The bits may be prioritized in an order starting with source ID, destination ID, RV, NDI, and HARQ process ID. The bits may be secured individually for each piece of information, all together, or in other combinations. At a minimum, just one or two bits may be secured. As a result, an eavesdropping or attacking device, such as UE 306, may not combine or decode data for the SCI-2 or determine whether data is old or new.

As indicated above, FIG. 4 is provided as an example. Other examples may differ from what is described with respect to FIG. 4.

Figure 5:
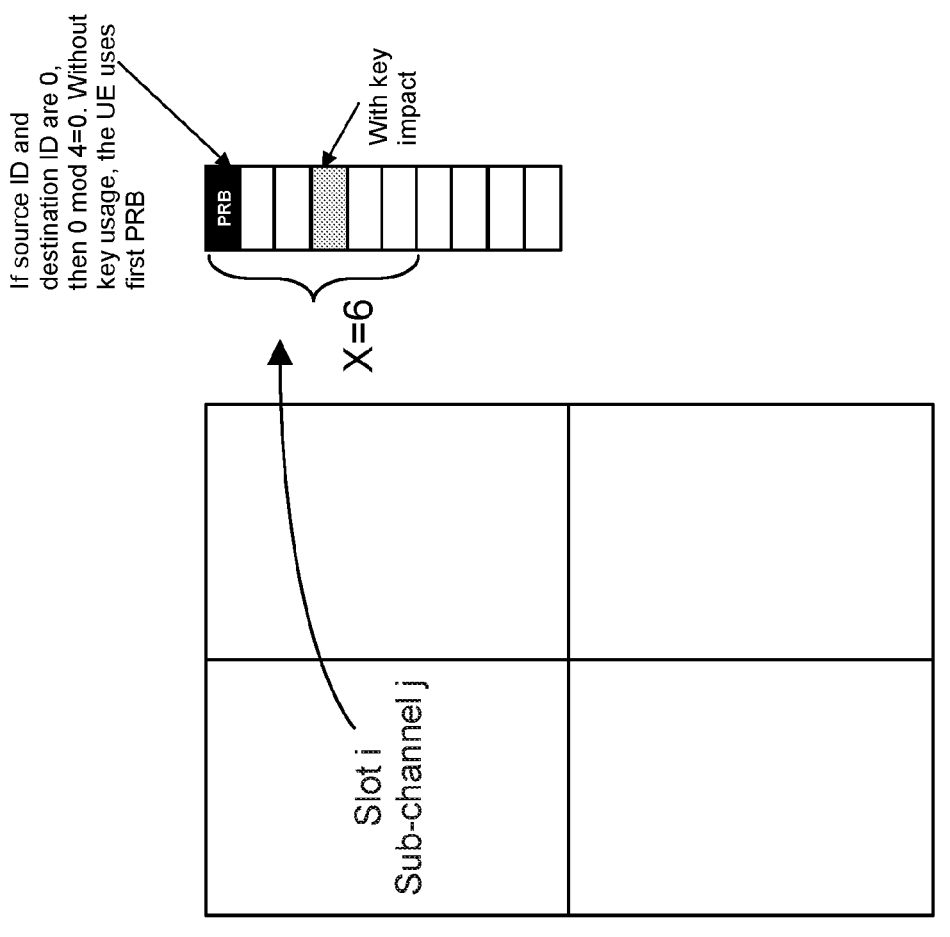
FIG. 5 is a diagram illustrating an example of resource selection, in accordance with the present disclosure.

FIG. 5 is a diagram illustrating an example 500 of resource selection, in accordance with the present disclosure.

In some aspects, UE 302 or UE 304 may transmit one or more bits on the PSFCH as a response to reference signals that are dedicated to extracting a secret key. UE 302 may secure a communication (e.g., HARQ feedback) on the PSFCH using the secret key. Example 500 shows RBs with slot i in sub-channel j. If a group common secret key is used, UE 302 may randomize the starting resource (i, j) using a group common secret key that is used by UEs (e.g., all UEs) that share a resource pool. For example, UE 302 may shift the starting resource (i, j) with a value that is common across all UEs that may legitimately use the resource pool. The group common secret key may be a per-resource pool key that is known only to the UEs that use the resource pool. UE 302 may obtain the group common secret key from an upper layer.

If the secret key is a UE-specific secret key, after obtaining the starting resource, UE 302 may transmit bits on the PSFCH based at least in part on a mapping of index values to resources. That is, UE 302 may select the starting resource based at least in part on the source ID and/or the destination ID, hashed with the secret key. For example, UE 302 may randomize the index used by UE 302 to select the starting resource with a formula such as index i=(source ID+destination ID+secret key in decimal) mod X, where X is the quantity of PSFCH resources based at least in part on the starting sub-channel of the PSSCH (e.g., sl-PSFCH-CandidateResourceType configured as startSubCH) or the quantity of subchannels for the PSSCH (e.g., sl-PSFCH-CandidateResourceType configured as allocSubCH). Example 500 shows how the starting resource may be shifted from a first PRB to a fourth PRB because of the secret key. UE 302 and UE 304 may determine the starting resource using the secret key, but an attack that does not have the secret key cannot determine the starting resource and thus cannot decode the correct bits.

In some aspects, UE 302 may secure the communication on the PSFCH in other ways. For example, UE 302 may XOR the source ID with the secret key (or part of the key), XOR the destination with the secret key (or part of the secret key), or XOR a sum of the source ID and the destination ID with the secret key (or part of the secret key). In some aspects, UE 302 may shift a cyclic shift (CS) of an ACK or NACK with the secret key. In some aspects, UE 302 may swap ACK and NACK CS values. As a result, an attacker cannot determine which HARQ feedback message applies to a communication. UE 302 may also combine any aspects discussed in connection with FIG. 5. For any operations performed by UE 302, UE 304 may perform the same operation or a reverse operation to obtain a secured sidelink communication.

UE 302 may also secure communications on the PSBCH. Sidelink synchronization signal (S-SS) and/or PSBCH bits may be scrambled by a sequence initialized at a fixed value. The sequence may be represented by $\tilde{b}(i)=(b(i)+c(i))$ mod 2. The scrambling sequence generator shall be initialized with $$C_{init} = N_{ID}^{SL}$$

at the start of each S-SS/PSBCH communication. In some aspects, UE 302 may use a group common secret key to randomize the S-SS/PSBCH bit scrambler. For example, UE 302 may XOR the $C_{init}$ with the group common secret key used by UEs that shares resource pool. UE 302 may add a shift to $C_{init}$ based at least in part on the secret key. In some aspects, UE 302 may add the secret key partially or fully in decimal in a formula such as $\tilde{b}(i)=(b(i)+c(i)+\text{secret\_key\_in\_decimal\_value})$ mod 2. In some aspects, UE 302 may secure the sidelink communication by performing an XOR operation with data bits (b(i)) and the secret key, with control information bits (c(i)) and the secret key, or with both the data and control information (b(i)+c(i)) and the secret key. As a result, UE 302 (or another device) may broadcast messages that UE 304 securely receives.

As indicated above, FIG. 5 is provided as an example. Other examples may differ from what is described with regard to FIG. 5.

Figure 6:
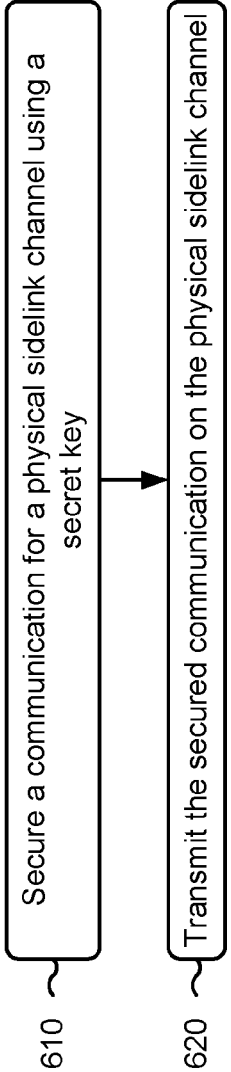
FIG. 6 is a diagram illustrating an example process performed, for example, by a first UE, in accordance with the present disclosure.

FIG. 6 is a diagram illustrating an example process 600 performed, for example, by a first UE, in accordance with the present disclosure. Example process 600 is an example where the first UE (e.g., UE 120) performs operations associated with sidelink channel security.

As shown in FIG. 6, in some aspects, process 600 may include securing a communication for a physical sidelink channel using a secret key (block 610). For example, the first UE (e.g., using communication manager 140 and/or security component 808 depicted in FIG. 8) may secure a communication for a physical sidelink channel using a secret key, as described above in connection with FIGS. 3-5.

As further shown in FIG. 6, in some aspects, process 600 may include transmitting the secured communication on the physical sidelink channel to a second UE (block 620). For example, the first UE (e.g., using communication manager 140 and/or transmission component 804 depicted in FIG. 8) may transmit the secured communication on the physical sidelink channel to a second UE, as described above in connection with FIGS. 3-5.

Process 600 may include additional aspects, such as any single aspect or any combination of aspects described below and/or in connection with one or more other processes described elsewhere herein.

In a first aspect, the secret key is a group common key.

In a second aspect, alone or in combination with the first aspect, the secret key is a UE-specific key.

In a third aspect, alone or in combination with one or more of the first and second aspects, securing the communication includes performing an XOR operation with an initialization value for the communication and the secret key.

In a fourth aspect, alone or in combination with one or more of the first through third aspects, securing the communication includes adding the secret key as a shift or decimal value to a data value of the communication and to a control value of the communication.

In a fifth aspect, alone or in combination with one or more of the first through fourth aspects, securing the communication includes performing an XOR operation with a data value of the communication and the secret key or performing an XOR operation with a control value of the communication and the secret key.

In a sixth aspect, alone or in combination with one or more of the first through fifth aspects, the physical sidelink channel is a PUCCH.

In a seventh aspect, alone or in combination with one or more of the first through sixth aspects, process 600 includes using the secret key to determine a first FD-OCC index.

In an eighth aspect, alone or in combination with one or more of the first through seventh aspects, using the secret key includes performing a modulo operation on a second FD-OCC index with the secret key.

In a ninth aspect, alone or in combination with one or more of the first through eighth aspects, using the secret key includes performing an XOR operation with a second FD-OCC index and the secret key.

In a tenth aspect, alone or in combination with one or more of the first through ninth aspects, the communication includes SCI-1.

In an eleventh aspect, alone or in combination with one or more of the first through tenth aspects, the communication includes SCI-2.

In a twelfth aspect, alone or in combination with one or more of the first through eleventh aspects, securing the communication includes one or more of scrambling, remapping, or performing an XOR operation on bits of the SCI-2 using the secret key.

In a thirteenth aspect, alone or in combination with one or more of the first through twelfth aspects, securing the communication includes securing a source ID and a destination ID of the communication.

In a fourteenth aspect, alone or in combination with one or more of the first through thirteenth aspects, securing the communication includes securing one or more of an RV, an ND, or a HARQ process ID.

In a fifteenth aspect, alone or in combination with one or more of the first through fourteenth aspects, the physical sidelink channel is a PSFCH.

In a sixteenth aspect, alone or in combination with one or more of the first through fifteenth aspects, process 600 includes using the secret key to determine a resource of a resource pool for the PSFCH.

In a seventeenth aspect, alone or in combination with one or more of the first through sixteenth aspects, using the secret key includes using the secret key to randomize an index for the resource and performing a modulo operation with the index and a quantity of resources for the PSFCH.

In an eighteenth aspect, alone or in combination with one or more of the first through seventeenth aspects, securing the communication includes performing an XOR operation with the secret key and one or more of a source ID, a destination ID, or a sum of the source ID and the destination ID.

In a nineteenth aspect, alone or in combination with one or more of the first through eighteenth aspects, the communication is for an S-SS for a PSBCH.

In a twentieth aspect, alone or in combination with one or more of the first through nineteenth aspects, securing the communication includes shifting a value of an ACK or NACK based at least in part on the secret key.

In a twenty-first aspect, alone or in combination with one or more of the first through twentieth aspects, securing the communication includes swapping a value of an ACK with a value of a NACK.

In a twenty-second aspect, alone or in combination with one or more of the first through twenty-first aspects, process 600 includes determining a subset of FD-OCC indices from among multiple FD-OCC indices based at least in part on the secret key, and securing the communication includes securing the communication by using an FD-OCC index that is in the subset of FD-OCC indices.

In a twenty-third aspect, alone or in combination with one or more of the first through twenty-second aspects, securing the communication includes determining a subset of DMRS scrambling identifiers from among multiple DMRS scrambling identifiers based at least in part on the secret key and securing the communication by using a DMRS scrambling identifier that is in the subset of DMRS scrambling identifiers.

In a twenty-fourth aspect, alone or in combination with one or more of the first through twenty-third aspects, determining the subset includes performing a modulo operation with the multiple DMRS scrambling identifiers (e.g., some or all) and the secret key, or performing an XOR operation with the multiple DMRS scrambling identifiers and the secret key.

In a twenty-fifth aspect, alone or in combination with one or more of the first through twenty-fourth aspects, process 600 includes selecting a DMRS scrambling ID based at least in part on the secret key, and securing the communication includes securing the communication by using the DMRS scrambling ID.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
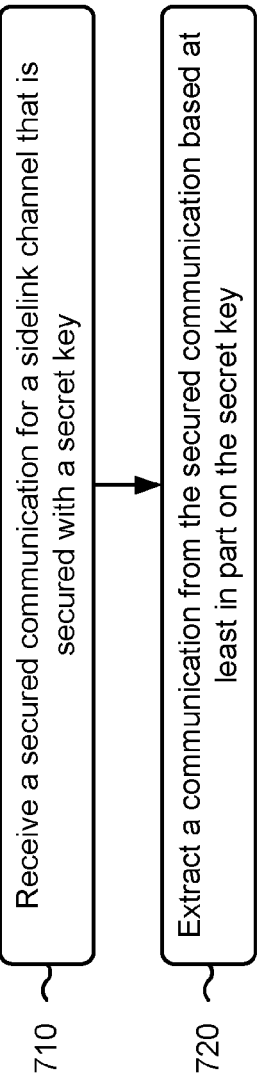
FIG. 7 is a diagram illustrating an example process performed, for example, by a second UE, in accordance with the present disclosure.

FIG. 7 is a diagram illustrating an example process 700 performed, for example, by a second UE, in accordance with the present disclosure. Example process 700 is an example where the second UE (e.g., UE 120) performs operations associated with sidelink channel security.

As shown in FIG. 7, in some aspects, process 700 may include receiving, from a first UE, a secured communication for a sidelink channel that is secured with a secret key (block 710). For example, the second UE (e.g., using communication manager 140 and/or reception component 902 depicted in FIG. 9) may receive, from a first UE, a secured communication for a sidelink channel that is secured with a secret key, as described above in connection with FIGS. 3-5.

As further shown in FIG. 7, in some aspects, process 700 may include extracting a communication from the secured communication based at least in part on the secret key (block 720). For example, the second UE (e.g., using communication manager 140 and/or security component 908 depicted in FIG. 9) may extract a communication from the secured communication based at least in part on the secret key, as described above in connection with FIGS. 3-5.

Process 700 may include additional aspects, such as any single aspect or any combination of aspects described below and/or in connection with one or more other processes described elsewhere herein.

In a first aspect, the secret key is a group common key.

In a second aspect, alone or in combination with the first aspect, the secret key is a UE-specific key.

In a third aspect, alone or in combination with one or more of the first and second aspects, extracting the communication includes performing an XOR operation with an initialization value for the secured communication and the secret key.

In a fourth aspect, alone or in combination with one or more of the first through third aspects, extracting the communication includes removing the secret key as a shift or decimal value from a data value of the secured communication and from a control value of the secured communication.

In a fifth aspect, alone or in combination with one or more of the first through fourth aspects, extracting the communication includes performing an XOR operation with a data value of the secured communication and the secret key or performing an XOR operation with a control value of the secured communication and the secret key.

In a sixth aspect, alone or in combination with one or more of the first through fifth aspects, securing the communication includes one or more of descrambling, remapping, or performing an XOR operation on the secured communication using the secret key.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
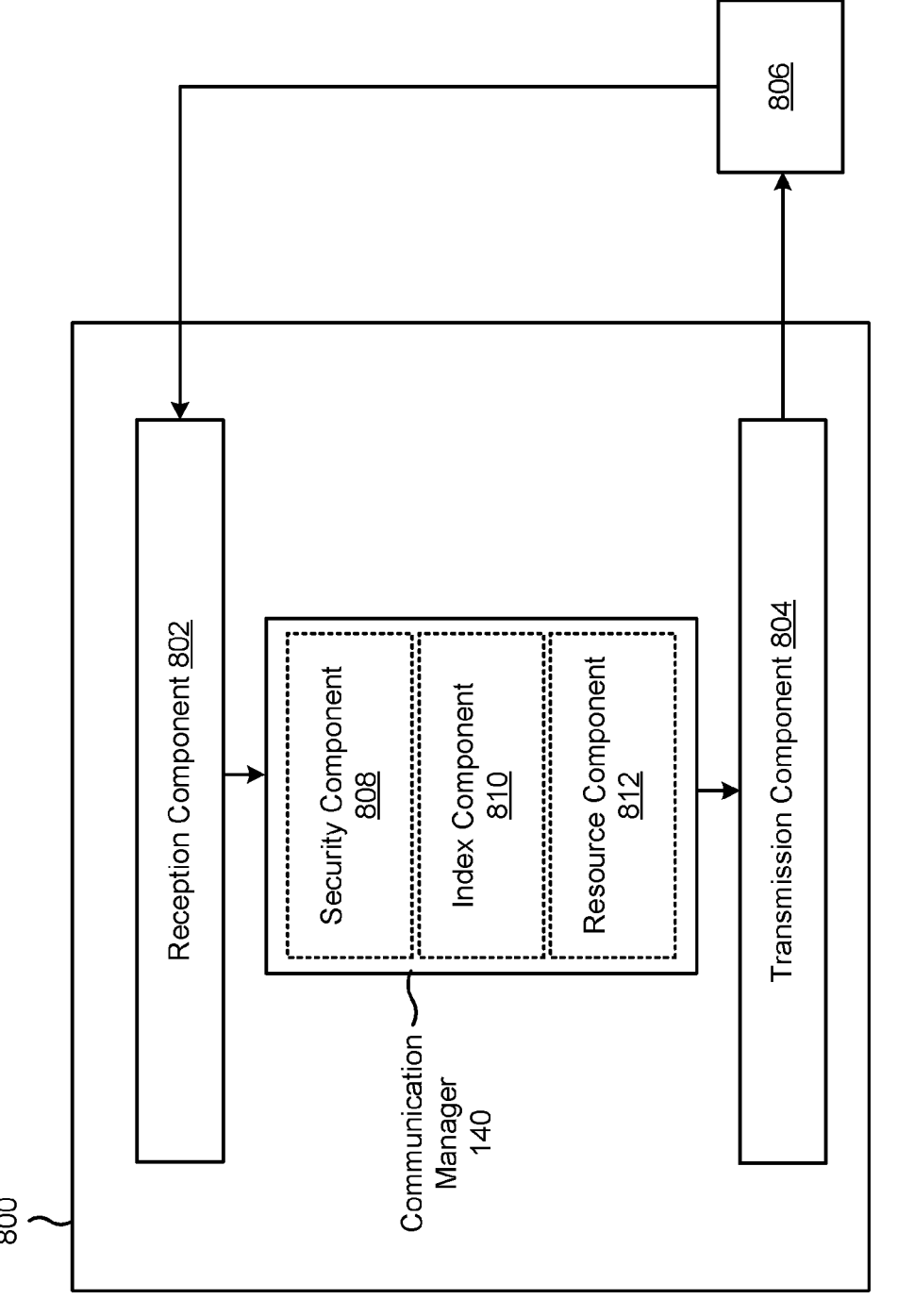
FIGS. 8-9 are diagrams of example apparatuses for wireless communication, in accordance with the present disclosure.

FIG. 8 is a diagram of an example apparatus 800 for wireless communication. The apparatus 800 may be a first UE (e.g., UE 120), or a first UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may a security component 808, an index component 810, and/or a resource component 812, among other examples.

In some aspects, the apparatus 800 may be configured to perform one or more operations described herein in connection with FIGS. 1-5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the first UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a modem, a demodulator, a MIMO detector, a receive processor, a controller/processor, a memory, or a combination thereof, of the first UE described in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the first UE described in connection with FIG. 2. In some aspects, the transmission component 804 may be co-located with the reception component 802 in a transceiver.

The security component 808 may secure a communication for a physical sidelink channel using a secret key. The transmission component 804 may transmit the secured communication on the physical sidelink channel. The index component 810 may use the secret key to determine a first FD-OCC index. The resource component 812 may use the secret key to determine a resource of a resource pool for the PSFCH.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
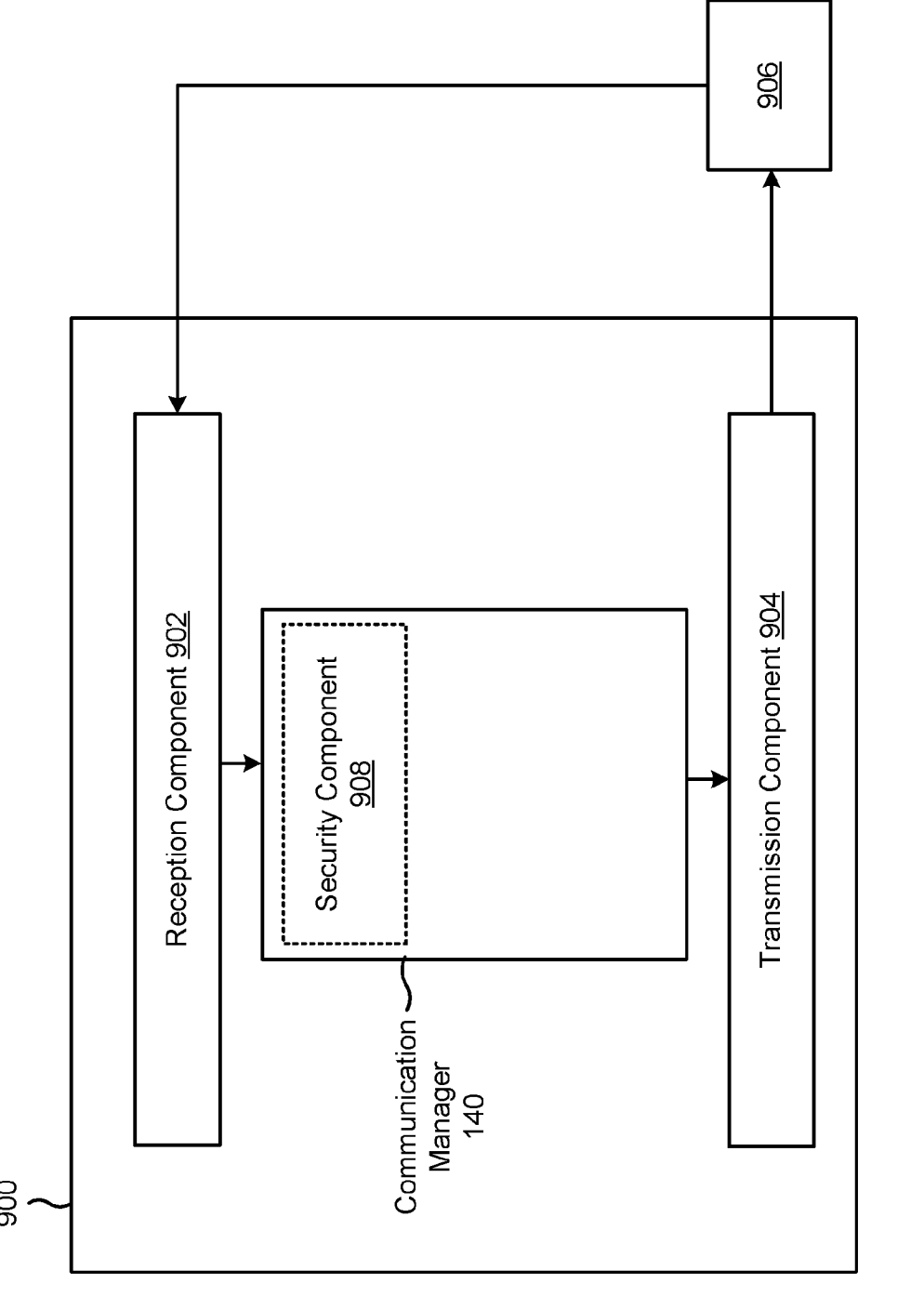

FIG. 9 is a diagram of an example apparatus 900 for wireless communication. The apparatus 900 may be a second UE, or a second UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may a security component 908, among other examples.

In some aspects, the apparatus 900 may be configured to perform one or more operations described herein in connection with FIGS. 1-5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the second UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the second UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the second UE described in connection with FIG. 2. In some aspects, the transmission component 904 may be co-located with the reception component 902 in a transceiver.

The reception component 902 may receive a secured communication for a sidelink channel that is secured with a secret key. The security component 908 may extract a communication from the secured communication based at least in part on the secret key.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a first user equipment (UE), comprising: securing a communication for a physical sidelink channel using a secret key; and transmitting the secured communication on the physical sidelink channel.

Aspect 2: The method of Aspect 1, wherein the secret key is a group common key.

Aspect 3: The method of Aspect 1, wherein the secret key is a UE-specific key.

Aspect 4: The method of any of Aspects 1-3, wherein securing the communication includes performing an XOR operation with an initialization value for the communication and the secret key.

Aspect 5: The method of any of Aspects 1-4, wherein securing the communication includes adding the secret key as a shift or decimal value to a data value of the communication and to a control value of the communication.

Aspect 6: The method of any of Aspects 1-5, wherein securing the communication includes performing an XOR operation with a data value of the communication and the secret key or performing an XOR operation with a control value of the communication and the secret key.

Aspect 7: The method of any of Aspects 1-6, wherein the physical sidelink channel is a physical sidelink control channel.

Aspect 8: The method of Aspect 7, further comprising using the secret key to determine a first frequency domain orthogonal cover code (FD-OCC) index.

Aspect 9: The method of Aspect 8, wherein using the secret key includes performing a modulo operation on a second FD-OCC index with the secret key.

Aspect 10: The method of Aspect 8, wherein using the secret key includes performing an XOR operation with a second FD-OCC index and the secret key.

Aspect 11: The method of any of Aspects 1-10, further comprising determining a subset of frequency domain orthogonal cover code (FD-OCC) indices from among multiple FD-OCC indices based at least in part on the secret key, wherein securing the communication includes securing the communication by using an FD-OCC index that is in the subset of FD-OCC indices.

Aspect 12: The method of any of Aspects 1-11, wherein the communication includes sidelink control information 1 (SCI-1).

Aspect 13: The method of any of Aspects 1-12, wherein the communication includes sidelink control information 2 (SCI-2).

Aspect 14: The method of Aspect 13, wherein securing the communication includes one or more of scrambling, remapping, or performing an XOR operation on bits of the SCI-2 using the secret key.

Aspect 15: The method of Aspect 13, wherein securing the communication includes securing a source identifier (ID) and a destination ID of the communication.

Aspect 16: The method of any of Aspects 13-15, wherein securing the communication includes securing one or more of a redundancy version, a new data indicator, or a hybrid automatic repeat request process identifier.

Aspect 17: The method of any of Aspects 1-16, wherein the physical sidelink channel is a physical sidelink feedback channel (PSFCH).

Aspect 18: The method of Aspect 17, further comprising using the secret key to determine a resource of a resource pool for the PSFCH.

Aspect 19: The method of Aspect 18, wherein using the secret key includes using the secret key to randomize an index for the resource and performing a modulo operation with the index and a quantity of resources for the PSFCH.

Aspect 20: The method of Aspect 17 or 18, wherein securing the communication includes performing an XOR operation with the secret key and one or more of a source identifier (ID), a destination ID, or a sum of the source ID and the destination ID.

Aspect 21: The method of any of Aspects 1-20, wherein the communication is for a sidelink synchronization signal for a physical sidelink broadcast channel.

Aspect 22: The method of any of Aspects 1-21, wherein securing the communication includes shifting a value of an acknowledgement or a negative acknowledgement based at least in part on the secret key.

Aspect 23: The method of any of Aspects 1-22, wherein securing the communication includes swapping a value of an acknowledgment with a value of a negative acknowledgement.

Aspect 24: The method of any of Aspects 1-23, wherein securing the communication includes determining a subset of demodulation reference signal (DMRS) scrambling identifiers from among multiple DMRS scrambling identifiers based at least in part on the secret key; and securing the communication by using a DMRS scrambling identifier that is in the subset of DMRS scrambling identifiers.

Aspect 25: The method of any of Aspects 1-24, wherein determining the subset includes performing a modulo operation with the multiple DMRS scrambling identifiers and the secret key, or performing an XOR operation with the multiple DMRS scrambling identifiers and the secret key.

Aspect 26: The method of any of Aspects 1-25, further comprising selecting a demodulation reference signal (DMRS) scrambling identifier based at least in part on the secret key, wherein securing the communication includes secure the communication by using the DMRS scrambling identifier.

Aspect 27: A method of wireless communication performed by a second user equipment (UE), comprising: receiving a secured communication for a sidelink channel that is secured with a secret key; and extracting a communication from the secured communication based at least in part on the secret key.

Aspect 28: The method of Aspect 27, wherein the secret key is a group common key.

Aspect 29: The method of Aspect 27, wherein the secret key is a UE-specific key.

Aspect 30: The method of any of Aspects 27-29, wherein extracting the communication includes performing an XOR operation with an initialization value for the secured communication and the secret key.

Aspect 31: The method of any of Aspects 27-30, wherein extracting the communication includes removing the secret key as a shift or decimal value from a data value of the secured communication and from a control value of the secured communication.

Aspect 32: The method of any of Aspects 27-31, wherein extracting the communication includes performing an XOR operation with a data value of the secured communication and the secret key or performing an XOR operation with a control value of the secured communication and the secret key.

Aspect 33: The method of any of Aspects 27-32, wherein securing the communication includes one or more of descrambling, remapping, or performing an XOR operation on the secured communication using the secret key.

Aspect 34: An apparatus for wireless communication at a device, comprising a processor; memory coupled with the processor, and instructions stored in the memory and executable by the processor to cause the apparatus to perform the method of one or more of Aspects 1-33.

Aspect 35: A device for wireless communication, comprising a memory and one or more processors coupled to the memory, the one or more processors configured to perform the method of one or more of Aspects 1-33.

Aspect 36: An apparatus for wireless communication, comprising at least one means for performing the method of one or more of Aspects 1-33.

Aspect 37: A non-transitory computer-readable medium storing code for wireless communication, the code comprising instructions executable by a processor to perform the method of one or more of Aspects 1-33.

Aspect 38: A non-transitory computer-readable medium storing a set of instructions for wireless communication, the set of instructions comprising one or more instructions that, when executed by one or more processors of a device, cause the device to perform the method of one or more of Aspects 1-33.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first user equipment (UE) for wireless communication, comprising:
a memory; and
one or more processors, coupled to the memory, configured to:
secure, at a physical layer, a communication for a physical sidelink channel using a secret key; and
transmit the secured communication on the physical sidelink channel to a second UE.

2. The UE of claim 1, wherein the secret key is a group common key.

3. The UE of claim 1, wherein the secret key is a UE-specific key.

4. The UE of claim 1, wherein the one or more processors, to secure the communication, are configured to perform an XOR operation with an initialization value for the communication and the secret key.

5. The UE of claim 1, wherein the one or more processors, to secure the communication, are configured to add the secret key as a shift or decimal value to a data value of the communication and to a control value of the communication.

6. The UE of claim 1, wherein the one or more processors, to secure the communication, are configured to perform an XOR operation with a data value of the communication and the secret key or perform an XOR operation with a control value of the communication and the secret key.

7. The UE of claim 1, wherein the physical sidelink channel is a physical sidelink control channel.

8. The UE of claim 1, wherein the one or more processors, to secure the communication, are configured to:
determine a subset of frequency domain orthogonal cover code (FD-OCC) indices from among multiple FD-OCC indices based at least in part on the secret key; and
secure the communication by using an FD-OCC index that is in the subset of FD-OCC indices.

9. The UE of claim 8, wherein the one or more processors, to determine the subset, are configured to perform a modulo operation with the multiple FD-OCC indices and the secret key, or perform an XOR operation with the multiple FD-OCC indices and the secret key.

10. The UE of claim 1, wherein the communication includes sidelink control information 1 (SCI-1) or SCI-2.

11. The UE of claim 10, wherein the one or more processors, to secure the communication, are configured to scramble, remap, or perform an XOR operation on bits of the SCI-2 using the secret key.

12. The UE of claim 10, wherein the one or more processors, to secure the communication, are configured to secure a source identifier (ID) and a destination ID of the communication.

13. The UE of claim 10, wherein the one or more processors, to secure the communication, are configured to secure one or more of a redundancy version, a new data indicator, or a hybrid automatic repeat request process identifier.

14. The UE of claim 1, wherein the physical sidelink channel is a physical sidelink feedback channel (PSFCH).

15. The UE of claim 14, wherein the one or more processors are configured to use the secret key to determine a resource of a resource pool for the PSFCH.

16. The UE of claim 15, wherein the one or more processors, to use the secret key, are configured to use the secret key to randomize an index for the resource and perform a modulo operation with the index and a quantity of resources for the PSFCH.

17. The UE of claim 15, wherein the one or more processors, to secure the communication, are configured to perform an XOR operation with the secret key and one or more of a source identifier (ID), a destination ID, or a sum of the source ID and the destination ID.

18. The UE of claim 1, wherein the communication is for a sidelink synchronization signal for a physical sidelink broadcast channel.

19. The UE of claim 1, wherein the one or more processors, to secure the communication, are configured to shift a value of an acknowledgement or a negative acknowledgement based at least in part on the secret key.

20. The UE of claim 1, wherein the one or more processors, to secure the communication, are configured to swap a value of an acknowledgment with a value of a negative acknowledgement.

21. The UE of claim 1, wherein the one or more processors, to secure the communication, are configured to:
determine a subset of demodulation reference signal (DMRS) scrambling identifiers from among multiple DMRS scrambling identifiers based at least in part on the secret key; and
secure the communication by using a DMRS scrambling identifier that is in the subset of DMRS scrambling identifiers.

22. The UE of claim 21, wherein the one or more processors, to determine the subset, are configured to perform a modulo operation with the multiple DMRS scrambling identifiers and the secret key, or perform an XOR operation with the multiple DMRS scrambling identifiers and the secret key.

23. The UE of claim 1, wherein the one or more processors, to secure the communication, are configured to:
select a demodulation reference signal (DMRS) scrambling identifier based at least in part on the secret key; and
secure the communication by using the DMRS scrambling identifier.

24. A second user equipment (UE) for wireless communication, comprising:

a memory; and one or more processors, coupled to the memory, configured to:

receive, from a first UE, a secured communication for a sidelink channel that is secured with a secret key at a physical layer; and extract a communication from the secured communication based at least in part on the secret key.

25. The UE of claim 24, wherein the secret key is a group common key or a UE-specific key.

26. The UE of claim 24, wherein the one or more processors, to extract the communication, are configured to perform an XOR operation with an initialization value for the secured communication and the secret key.

27. The UE of claim 24, wherein the one or more processors, to extract the communication, are configured to remove the secret key as a shift or decimal value from a data value of the secured communication and from a control value of the secured communication.

28. The UE of claim 24, wherein the one or more processors, to extract the communication, are configured to perform an XOR operation with a data value of the secured communication and the secret key or perform an XOR operation with a control value of the secured communication and the secret key.

29. The UE of claim 24, wherein the one or more processors, to secure the communication, are configured to descramble, remap, or perform an XOR operation on the secured communication using the secret key.

30. A first user equipment (UE) for wireless communication, comprising:

a memory; and one or more processors, coupled to the memory, configured to:

secure a communication for a physical sidelink channel using a secret key by at least one of:

determining a subset of frequency domain orthogonal cover code (FD-OCC) indices from among multiple FD-OCC indices based at least in part on the secret key, and securing the communication by using an FD-OCC index that is in the subset of FD-OCC indices;

shifting a value of an acknowledgement or a negative acknowledgement based at least in part on the secret key;

swapping a value of an acknowledgement with a value of a negative acknowledgement; or selecting a DMRS scrambling identifier based at least in part on the secret key, and securing the communication by using the DMRS scrambling identifier; and transmit the secured communication on the physical sidelink channel to a second UE.

* * * * *